United States Patent
Kaner et al.

(10) Patent No.: US 12,337,222 B2
(45) Date of Patent: Jun. 24, 2025

(54) CLIMBING WALL IN WHICH THE CLIMBING ROUTE IS CHANGED BY AN AUTOMATED MECHANISM

(71) Applicant: Roy Kaner, Rehovot (IL)

(72) Inventors: Roy Kaner, Rehovot (IL); Tamir Levy-Aldema, Modiln (IL); Ilan Matan Hurwitz, Rishon LeZion (IL)

(73) Assignee: Roy Kaner, Rehovot (IL)

( * ) Notice: Subject to any disclaimer, the term of this patent is extended or adjusted under 35 U.S.C. 154(b) by 111 days.

(21) Appl. No.: 18/201,795

(22) Filed: May 25, 2023

(65) Prior Publication Data

US 2023/0381620 A1    Nov. 30, 2023

Related U.S. Application Data

(60) Provisional application No. 63/346,334, filed on May 27, 2022.

(51) Int. Cl.
*A63B 69/00* (2006.01)
*B25J 15/00* (2006.01)

(52) U.S. Cl.
CPC ....... *A63B 69/0048* (2013.01); *B25J 15/0019* (2013.01)

(58) Field of Classification Search
CPC .................. A63B 9/00; A63B 2009/002–008
See application file for complete search history.

(56) References Cited

U.S. PATENT DOCUMENTS

| | | | | |
|---|---|---|---|---|
| 2007/0240281 A1* | 10/2007 | Meissner | ........... | A63B 69/0048 16/108 |
| 2015/0335974 A1* | 11/2015 | Levesque | ........... | A63B 69/0048 482/2 |
| 2015/0343288 A1* | 12/2015 | Taggart | .............. | A63B 71/0054 482/37 |
| 2019/0015687 A1* | 1/2019 | Knickrehm | .............. | A62B 1/14 |
| 2020/0023257 A1* | 1/2020 | Speed | ................ | A63B 69/0048 |
| 2020/0171369 A1* | 6/2020 | Sudeith | .............. | A63B 69/0048 |

FOREIGN PATENT DOCUMENTS

EP    2420304 A1 *  2/2012  ......... A63B 69/0048
EP    4124366 A1 *  2/2023  ......... A63B 69/0048

* cited by examiner

*Primary Examiner* — Nyca T Nguyen

(57) ABSTRACT

An apparatus comprising multiple climbing holds and a robot having an end-effector, the end-effector adapted to be detachably connected to each of the multiple climbing holds. A controller adapted to instruct the robot and/or the end-effector to select one of the multiple climbing holds from a carrying medium. Grab a selected climbing hold of the multiple climbing holds. Mechanically attach the selected climbing hold to the carrying medium at a desired location and at an orientation of the selected climbing hold relative to an orientation of the carrying medium. Grab the selected climbing hold to mechanically detach the selected climbing hold from the carrying medium and pull the selected climbing hold out of the carrying medium.

21 Claims, 10 Drawing Sheets

CLIMBING WALL IN WHICH THE CLIMBING ROUTE IS CHANGED BY AN AUTOMATED MECHANISM

RELATED APPLICATION

This application claims the benefit of priority under 35 USC § 119(e) of U.S. Provisional Patent Application No. 63/346,334 filed on May 27, 2022. The contents of the above applications are all incorporated by reference as if fully set forth herein in their entirety.

FIELD AND BACKGROUND OF THE INVENTION

The present disclosure, in some embodiments thereof, relates to an automated mechanism and, more specifically the automated mechanism applied to climbing holds held in a climbing wall but not exclusively, to climbing holds held in a climbing wall.

In many situations, robots can increase productivity, efficiency, quality and consistency of products. Unlike humans, robots do not get bored and until they wear out, they can do the same task or a sequence of tasks repeatedly. Robots can make repeatable movements that may be accurate to fractions of a millimeter in some cases and can work in environments that are unsafe for humans, for example at great heights above the ground. Robots may not require the same environmental or safety conditions that humans require and may include sensors and/or actuators that may be more capable than humans are.

Machine vision (MV) is a technology that may be utilized to provide imaging-based automatic inspection and analysis for such applications as automatic inspection, process control, and robot guidance. Machine vision (MV) may include technology and methods used to extract information from an image on an automated basis. The information extracted can be a simple good-part/bad-part signal, or more a complex set of data such as the identity, position and orientation of each object in an image. The information can be used for such applications as automatic inspection and robot and process guidance in industry, for security monitoring and vehicle guidance. Machine vision commonly provides location and orientation information to a robot. Location and orientation information may further allow a robot to grasp properly an object in the field of vision. The capability of machine vision to provide location and orientation information may also be used to guide a motion that is simpler than robots, such as a one or two axis motion controller. The overall process of MV includes planning the details of the requirements and project, and then creating a solution.

A climbing hold is a shaped grip that is usually attached to a climbing wall so climbers can grab or step on it. On most walls, climbing holds are arranged in paths, called routes, by specially trained route setters. Climbing holds come in a large array of sizes and shapes to provide different levels of challenge to a climber. Climbing holds may be either bolted to a wall via hex-head bolts and existing t-nuts or they are screwed on with several small screws. In extreme cases, concrete anchors may be used (if putting holds on the underside of a bridge, for example).

SUMMARY OF THE INVENTION

It is an object of the present invention to provide an apparatus, a system, a computer program product, and a method for an automated mechanism and, more specifically to the automated mechanism applied to climbing holds held in a climbing wall, but not exclusively, to climbing holds held in a climbing wall.

An apparatus comprising multiple climbing holds and a robot having an end-effector. The end-effector adapted to be detachably connected to each of the multiple climbing holds. A controller adapted to instruct the robot and/or the end-effector to select one of the multiple climbing holds from a carrying medium. Grab a selected climbing hold of the multiple climbing holds. Mechanically attach the selected climbing hold to the carrying medium at a desired location and at an orientation of the selected climbing hold relative to an orientation of the carrying medium. Grab the selected climbing hold to mechanically detach the selected climbing hold from the carrying medium and pull the selected climbing hold out of the carrying medium.

The carrying medium may be a store area and/or multiple interconnected climbing surfaces included in a climbing wall. The carrying medium may include one or more plates to enable the mechanical reattaching of the selected climbing hold to and from the carrying medium. The plate may be incorporated in each carrying medium to make each carrying medium a monolithic structure. The apparatus may further comprise an actuator adapted to rotate the carrying medium in a control loop. The inserting of the climbing hold into the carrying medium or pulling the climbing hold out of the carrying medium may be according to a climb route selected for a climber of the climbing wall. The multiple climbing holds may be multiple different sizes and shapes. The multiple climbing holds may be stored in the store area in multiple addressable holder places for selection by the robot.

The robot may be a robotic arm and/or a two dimensional movement system. The robot may be configurable to insert the climbing hold into the carrying medium at a desired rotational angular position according to a climb route selected for a climber of the climbing wall. The robot may be configurable to remove the climbing hold from the carrying medium and to place the climbing hold at a designated address of a holder place of the multiple addressable holder places at a desired rotational angular position.

A method to fasten an end-effector to a robot, the robot and end-effector utilized to select and grab respectively a climbing hold of the multiple climbing holds from multiple addressable holder places. The robot stores the multiple climbing holds in the multiple addressable holder places. The climbing hold is attached to a plate of the multiple plates by the robot inserting the climbing hold into the plate and by utilizing the end-effector. The robot and end-effector respectively to choose and grab, a climbing hold of the multiple climbing holds attached to a plate of the multiple plates. Detaching the climbing hold with the end-effector and the robot to pull the climbing hold out of the plate.

The fastening of the end-effector to the robot may be by electro-mechanically fastening, electro-magnetically fastening, pneumatically fastening or hook latching fastening. Multiple plates may be attached in multiple interconnected climbing surfaces included in a climbing wall. The multiple interconnected climbing surfaces are optionally included a climbing wall having a conveyor, for example as depicted in FIG. 9. The inserting of the climbing hold into the plate or the pulling of the climbing hold out of the plate may be according to a climb route selected for a climber of the climbing wall. The robot may be a robotic arm and/or a two dimensional movement system. The multiple climbing holds may be multiple different sizes and shapes. The climbing hold inserted into the plate at a desired rotational angular position may be according to a climb route selected for a climber of the climbing wall. The detaching of the climbing hold from the plate and placing of the climbing hold at a designated address of a holder place of the multiple addressable holder places may be at a desired rotational angular position.

A climbing hold mechanism including a body disposed and mechanically attached between a front plate and a back plate including a front hole and a back hole respectively. A pin shaft including a section of the pin shaft protruding out from and perpendicular to the front plate and the pin shaft mechanically attached to the front hole and further attached to an interior wall of the body. A ball-lock pin including a head end with a diameter wider than the diameter of the ball-lock pin. A lock end opposite the head end that includes a reduced diameter section of the ball-lock pin. A spring disposed in the pin shaft around the diameter of the ball-lock pin and located between the front plate and the head end. One or more balls seat-able in an aperture in the section of the pin shaft protruding out from and perpendicular to the pin shaft.

The climbing hold mechanism may further include a loading pin attached to the front plate and protruding out from and perpendicular to the front plate. The loading pin may be located concentrically lateral to the ball-lock pin. The loading pin and the pin shaft may be re-insertable into respective holes of a plate. The front plate may be magnetic. The ball-lock pin may be configurable to receive a force to the spring and to the head end through the back hole of the back plate to simultaneously unlock the ball-lock pin and pull the ball-lock pin out of the plate. The force unseats the one or more balls from the aperture into the reduced diameter section of the ball-lock pin. To release the force from the spring and to the head end, in order to simultaneously lock and insert the ball-lock pin into the plate. The release reseats the one or more balls in the aperture adjacent to the reduced diameter section of the ball-lock pin.

The foregoing and other objects are achieved by the features of the independent claims. Further implementation forms are apparent from the dependent claims, the description and the figures.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DESCRIPTION OF SPECIFIC EMBODIMENTS OF THE INVENTION

Figure 1:
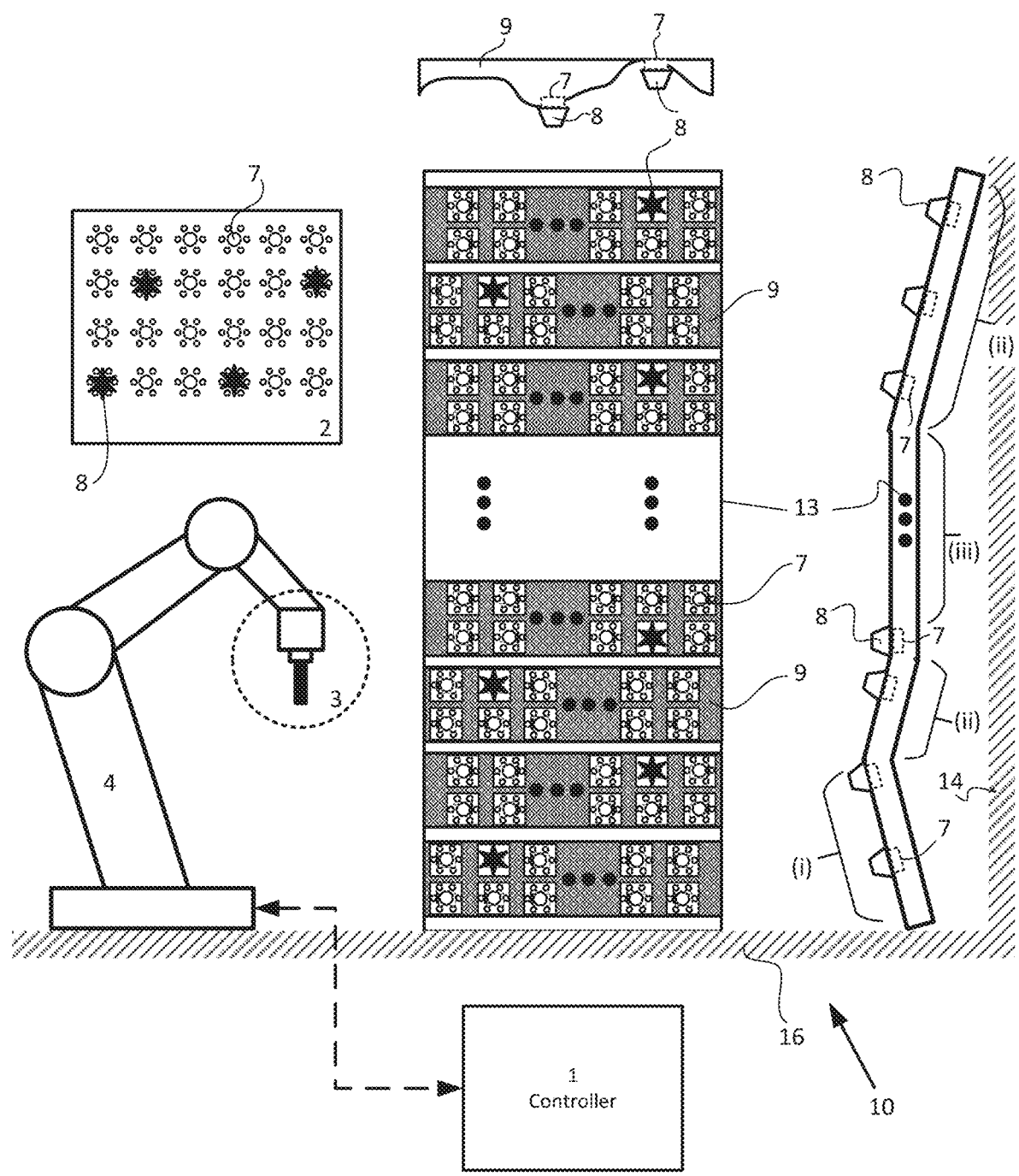
FIG. 1 shows an apparatus, in accordance with some embodiments.

The present disclosure, in some embodiments thereof, relates to an automated mechanism and, more specifically to climbing holds held in a climbing wall, but not exclusively, to climbing holds held in a climbing wall.

By way of introduction aspects of the disclosure below, describe a robotic arm or manipulator that may be controlled by a control algorithm of a controller. The robotic arm or manipulator to attach or reattach to a climbing hold from one addressable place in a carrying medium to another place in the carrying medium, to another addressable place in another carrying medium or to another carrying medium which acts as a storage area. The store area and the carrying medium includes multiple plates that are utilized to store and hold multiple climbing holds. Plates may be uniquely addressable for a particular type of climbing hold that has a particular shape profile. Climbing hold may include an RF identity (ID) tag or utilize machine vision to enable for example, for the correct identification and selection of a climbing hold to and from the store area or to and from carrying mediums included in various types of climbing walls. Changing climbing holds on a climbing wall may be extremely time intensive and requires trained professionals climbing the wall and manually changing the climbing holds. Manually changing the climbing holds on a rotating climbing wall may also be time consuming and for the sake of safety can only be done manually when the climbing wall is at rest. The electro-mechanical system described herein is capable of picking and placing climbing holds on a side of a wall not being climbed on (which could be moving), as well as a specialized locking mechanism for the climbing holds.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which shows an apparatus 10, in accordance with some embodiments. Apparatus 10 includes a front view, plan view and side view of a climbing wall 13 attached to a wall 14 and ground 16 in proximity to a robotic arm 4 and a store area 2 (all drawn not to scale). Store area 2 includes multiple plates 7 that are utilized to hold and store multiple climbing holds 8. Plates 7 as shown are laid out in a matrix format so that each plate 7 may be uniquely addressable for a particular type of climbing hold 8 that has a particular shape profile. Plates 7 may also be laid it in a random format and also addressable or a particular type of climbing hold 8 that has a particular shape profile. Each carrying medium 9 includes multiple plates 7 attached to each carrying medium 9. Each carrying medium 9 may include the features of multiple plates 7 incorporated in each carrying medium 9 to make each carrying medium 9 a monolithic structure. Each carrying medium 9 may be uniquely addressable and each plate 7 may also be uniquely addressable at a particular location in a carrying medium 9. Examples of shape profiles for a commercially available types of climbing holds may include categories of climbing hold with descriptors that include "crimpers/edges", "pockets", "footholds", "jugs", "pinches", "rails", "slopers", "roof" or "ceiling jugs".

According to features described herein, climbing hold 8 may include an RF identity (ID) tag to enable for example, a correct selection of a climbing hold 8 from store area 2 or a climbing hold 8 from carrying medium 9 included in climbing wall 13 as shown in the front view. The correct selection may be made by robotic arm 4 under control of controller 1. Robotic arm 4 may be implementable without the need of sensory feedback to provide enough accuracy in object identification, selection and memory usage of a control loop for robotic arm 4. Robotic arm 4 utilizing sensory feedback for example, may include a RF ID reader or a sensor included in end-effector 3 to enable the correct identification and selection of an object or climbing hold 8. Robotic arm 4 for example, may further include a camera or image sensor (not shown) that may be included in end-effector 3 to enable the correct identification and selection and optimum grab of climbing hold 8 from store area 2 or carrying medium 9. The camera or image sensor may therefore enable machine vision (MV) to enable the control of robotic arm 4 by controller 1. Robotic arm 4 may also be implemented to enable the correct identification and selection by other means known in the field of robotics. The other means may include object detection methods that utilize boosted cascade classifiers, dictionary based object detection algorithms, partial object handling, Convolutional Neural Networks (CNN) or other appropriate structured algorithms.

In the case of apparatus 10, machine vision (MV) may therefore, include technology and methods used to extract information from an image captured of a climbing hold 8. The information extracted can be a simple good-part/bad-part signal, or more a complex set of data such as the identity, position and orientation of each climbing hold 8 in an image for example. In general, robotic arm 4 may provide position and orientation of end effector 3 to grab and maneuver each climbing hold 8 up to and including six degrees of freedom. Six degrees of freedom (6DOF) refers to the freedom of movement of end effector 3 and/or climbing hold 8 in three-dimensional (3D) space. Specifically, selected and grabbed climbing hold 8 is free to change position as forward/backward (surge), up/down (heave), left/right (sway) translation in three perpendicular axes, combined with changes in orientation through rotation about three perpendicular axes, often termed yaw (normal axis), pitch (transverse axis), and roll (longitudinal axis).

In the drawing of apparatus 10 is shown the side view of climbing wall 13. The side view shows that in addition to a vertical section formed by multiple sections of carrying mediums 9 to represent a vertical face (iii) one may find in a rock-climbing situation. Other sections shown in the side view include overhanging faces (ii) that are overhung or angled more than 90 degrees and slabs (i) that are angled at less than 90 degrees or less than vertical. The side view shows climbing holds 8 that are attached to plates 7. The plan view shows a possible shape profile of the carrying medium 9 and shows climbing holds 8 that are attached to plates 7, whereas, the side view shows a flat surface for carrying mediums 9. In sum, the surface of carrying mediums 9 may include flat planar surfaces and/or three-dimensional (3D) surface profiles as well as textures that mimic certain types of rock such as Igneous, Sedimentary or Metamorphic.

The six degrees of freedom (6DOF) provided by robotic arm 4 and end-effector 3 under the control of controller 1, enable a selection of a particular climbing hold 8 from store area 2 according a climb route that is appropriate to a skill level of a climber using climbing wall 13. The selection may for example, include the use of a RF ID reader or sensor included in end-effector 3 to enable the correct selection of the type of climbing hold 8 such as a "foothold" for example. Machine vision (MV) included in end-effector 3 may allow for an assessment as to the present orientation of climbing hold 8 in store area 2. The assessment may further enable the orientation of end-effector 3 and its movement towards store area 2 to grab a selected climbing hold 8. Robotic arm 4 and end-effector 3 may then be moved towards climbing wall 13 to mechanically attach the selected climbing hold 8 to a specific plate 7/carrying medium 9. The mechanical attachment being at a desired location and at an orientation of the selected climbing hold 8 relative to an orientation of carrying medium 9. The different orientations of carrying medium 9 are shown with respect to slab (i), overhanging faces (ii), vertical faces (iii) and the surfaces of carrying mediums 9 may that may include flat planar surfaces and/or three-dimensional (3D) surface profiles. In a similar way, robotic arm 4 and end-effector 3 may then be moved towards climbing wall 13 to mechanically detach a selected climbing hold 8 from a specific plate 7/carrying medium 9. The selection, grabbing and detaching of the selected climbing hold 8 is at a desired location and at an orientation of the selected climbing hold 8 relative to an orientation of carrying medium 9. The grabbing and detaching of the selected climbing hold 8 enables the selected climbing hold to be pulled out from the specific plate 7/carrying medium 9.

Figure 2:
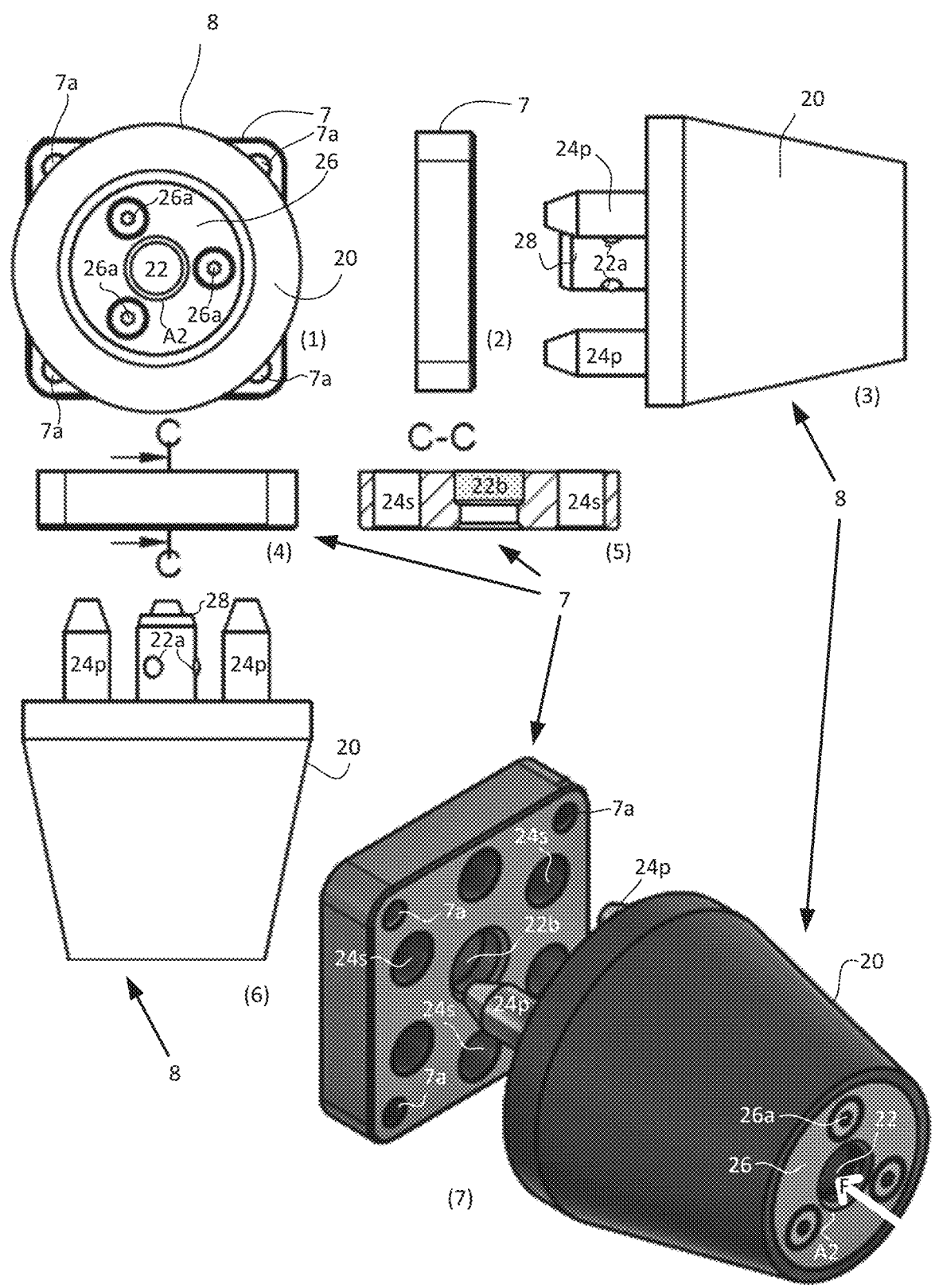
FIG. 2, shows further details of a plate and a climbing hold, in accordance with some embodiments.

Reference is now made to FIG. 2, which shows further details of a plate 7 and a climbing hold 8, in accordance with some embodiments. A top plan view (1) shows climbing hold 8 above plate 7. Plate 7 includes four mounting holes 7a which may be utilized to attach plate 7 to carrying mediums 9 or to store area 2. Climbing hold 8 includes body 20 which shown as a cone, where a back plate 26 is attached to the cap end of the cone by bolts 26a. Back plate 26 includes an aperture A2 that gives access for a force to be applied to a ball-lock pin 22. Side view (2) of plate 7 show the rounded corners of plate 7. Side view (3) of climbing hold 8, shows pin shaft 28 protruding out the base end of body 20 perpendicular to the base radius and centrally located to the base radius.

Apertures in the side of pin shaft 28 seats one or more balls 22a. Concentrically lateral to and surrounding pin shaft 28 is one or more loading pins 24p protruding out the base end of body 20 perpendicular to the base radius. The one or more loading pins 24p and the protruding part of pin shaft 28 are re-insertable into respective holes 24s and 22b of plate 7. In side view (3) the cap radius of the cap end is smaller than the base radius of the base end. As described above, the shape of body 20 may be any shape included in the categories of climbing hold with shape descriptors that include "crimpers/edges", "pockets", "footholds", "jugs", "pinches", "rails", "slopers", "roof" or "ceiling jugs". Bottom side view (6) similarly shows apertures in the side of pin shaft 28 that seats one or more balls 22a. Further, concentrically lateral to and surrounding pin shaft 28 is one or more loading pins 24p protruding out the base end of body 20 perpendicular to the base radius.

Bottom side view (4) shows plate 7 and a line of cross section CC. Cross sectional drawing (5) of plate 7 shows the details of cross section CC. Holes 24s and 22b receive an insertion of the one or more loading pins 24p and the protruding part of pin shaft 28 respectively. A feature described in greater detail below is of the insertion in hole 22b of pin shaft 28 and how the protrusion one or more balls 22a from pin shaft 28 are fixed in the shaded portion of hole 22b. Balls 22a fixed in the shaded portion of hole 22b enables climbing hold 8 to be locked into plate 7. The insertion loading pins 24p into holes 24s prevent the rotation climbing hold 8 and balls 22a enables climbing hold 8 to be locked into plate 7.

Perspective view (7) shows plate 7 and climbing hold 8 in an alignment for insertion of three loading pins 24p (only two shown) and the protruding part of pin shaft 28 (not shown) into respective holes 24s and 22b of plate 7. Climbing hold 8 includes body 20 which is shown as a cone where a back plate 26 is attached to the cap end of the cone by bolts 26a. A force F may be applied to ball-lock pin 22 through aperture A2 that unseats one or more balls 22a (not shown) back into the protruding part of pin shaft 28. Insertion of the protruding part of pin shaft 28 into hole 22b is by end effector 3 moving grabbed climbing hold 8 towards plate 7 at a desired location and at an orientation relative to an orientation of plate 7 in carrying medium 9. Subsequent to insertion of the protruding part of pin shaft 28 into hole 22b and the removal of force F from ball-lock pin 22 through aperture A2, locks balls 22a in the shaded portion of hole 22b, thereby attaching climbing hold 8 to plate 7.

Figure 3:
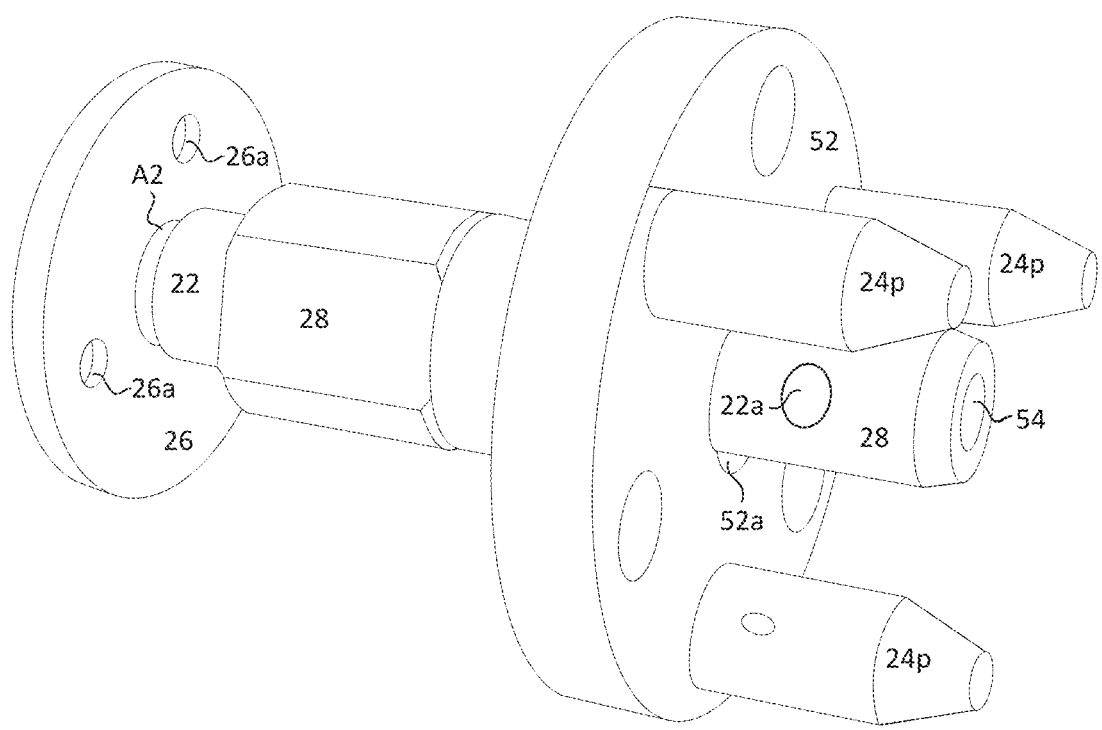
FIG. 3 shows further perspective details of a climbing hold 8, in accordance with some embodiments.

Reference is now made to FIG. 3, which shows further perspective details of climbing hold 8 in detail, in accordance with some embodiments. Climbing hold 8 is shown without body 20 to show ball-lock pin 22 that force F may be applied to through aperture A2 of back plate 26. Back plate 26 attaches to body 20 by bolts 26a (not shown). Ball-lock pin 22 is moveable in pin shaft 28 to the extent that the lock end of ball-lock pin 22 may protrude out of aperture 54 of pin shaft 28. Pin shaft 28 goes through and attaches to front plate 52 and includes a section of pin shaft 28 protruding out from and perpendicular to the front plate 52, and pin shaft (28) mechanically attaches to front hole 52a. At least one ball 22a is shown seated in an aperture in the section of the pin shaft (28) that protrudes out from and is perpendicular to the pin shaft 28.

Figure 4:
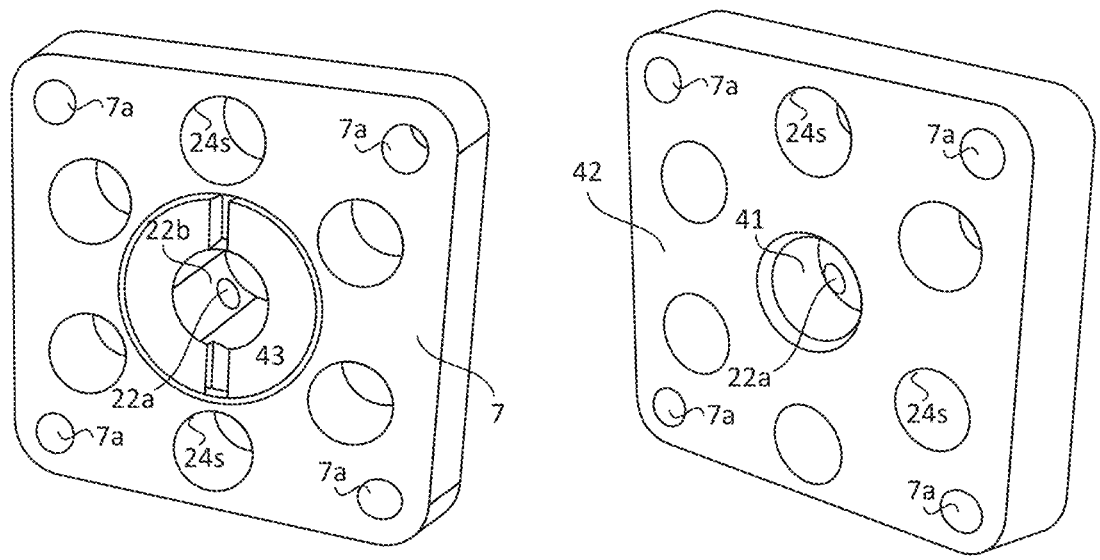
FIG. 4 shows further details of two plates in detail, in accordance with some embodiments.

Reference is now made to FIG. 4, which shows further details of plates 7 and 42 in greater detail, in accordance with some embodiments. The difference between plate 7 and plate is that plate 7 includes a position bushing 43. Both plates 7 and 42 include mounting holes that may be utilized to attach plate 7 to carrying mediums 9 or to store area 2. By way of non-limiting example, in the case of six holes 24s and three loading pins 24p, 60° degree increments of rotational orientation relative to the planar surface of plates 7 or 42 are provided to attach climbing hold 8 to plates 7 or 42.

Insertion of the protruding part of pin shaft 28 into hole 22b is by end effector 3 (not shown) moving grabbed climbing hold 8 (not shown) towards plate 7 at a desired location and at an orientation relative to an orientation of plate 7 in carrying medium 9. Subsequent to an insertion of the protruding part of pin shaft 28 (not shown) into hole 22b, the insertion when force F (not shown) is removed from ball-lock pin 22 (not shown), one or more balls 22a are locked in hole 22b included in position bushing 43, thereby attaching climbing hold 8 to plate 7. Similarly, insertion of the protruding part of pin shaft 28 into hole 41 is by end effector 3 moving grabbed climbing hold 8 towards plate 42 at a desired location and at an orientation relative to an orientation of plate 42 in carrying medium 9. Subsequent to insertion of the protruding part of pin shaft 28 into hole 41 when force F is removed from ball-lock pin 22, one or more balls 22a are locked behind the back of plate 42, thereby attaching climbing hold 8 to plate 42.

Figure 5:
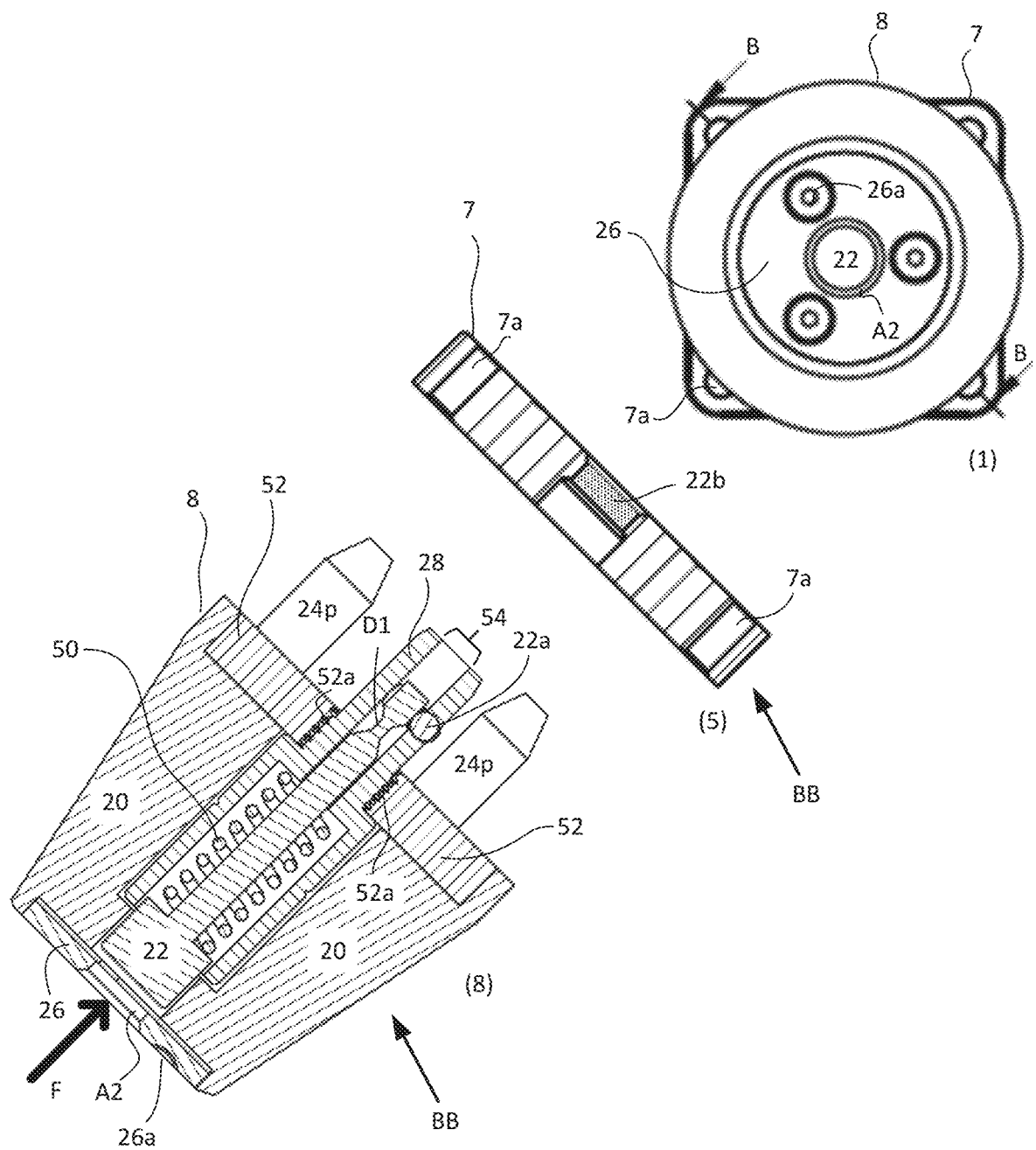
FIG. 5 shows further details of a cross section of a plate and climbing hole, in accordance with some embodiments.

Reference is now made to FIG. 5, which shows further details of a cross section BB of plate 7 and climbing hole 8, in accordance with some embodiments. Top plan view (1) shows climbing hold 8 above plate 7. Plate 7 includes four mounting holes 7a which may be utilized to attach plate 7 to carrying mediums 9 or to store area 2. Climbing hold 8 includes body 20 which shown as a cone where a back plate 26 is attached to the cap end of the cone by bolts 26a. Cross section BB of plate 7 in cross section view (5) shows the details of holes 24s and 22b configured receive an insertion of the one or more loading pins 24p and the protruding part of pin shaft 28 respectively.

Cross section BB in cross section view (8) shows the inner details of climbing hold 8. Back plate 26 includes an aperture A2 that gives access for a force F to be applied to a ball-lock pin 22. Back plate 26 attaches to body 20 with bolts 26a. Body 20 is shown as a cone where a back plate 26 is attached to the cap end of the cone by bolts 26a. Force F may be applied to a head end (212) of ball-lock pin 22 that has a diameter wider than the diameter of the ball-lock pin (22) which protrudes through a wider diameter of pin shaft 28 compared to a narrower diameter of the section of pin shaft 28 protruding out from and perpendicular to the front plate 52. A portion of the narrower diameter of the section of pin shaft 28 is threaded to enable pin shaft 28 to mechanically attach to threaded front hole 52a and perpendicularly to front plate 52, by screwing the portion into threaded front hole 52a. Body 20 encapsulates and may mechanically attach to both the exterior of pin shaft 28 and front plate 52 by use of an adhesive. The interior of pin shaft 28 between front plate 52 and back plate 26 accommodates a spring 50 which is coiled around ball-lock pin 22 wider diameter of pin shaft 28 compared to a narrower diameter of the section of pin shaft 28 protruding out from and perpendicular to the front plate 52. Ball-lock pin 22 is moveable by force F in pin shaft 28 to the extent that the lock end of ball-lock pin 22 may protrude out of aperture 54 of pin shaft 28.

Without force F applied, climbing hold 8 is in a locked position where ball 22a is seated in an aperture in the section of the pin shaft 28 protruding out from and perpendicular to the pin shaft (28). The function of spring 50 is to maintain the locked position both when climbing hold 8 is out of plate 7. Application of force F to applied to a head end of ball-lock pin 22 so that the lock end of ball-lock pin 22 moves towards aperture 54. When the reduced diameter D1 of the lock end is parallel to ball 22a, ball 22a is unseated from the aperture when the section of pin shaft 28 that protrudes out from and perpendicular to the front plate 52 is inserted into hole 22b of plate 7. When ball 22a is unseated from the aperture because of the insertion into hole 22b, pin shaft 28 is said to be in the unlocked position. Subsequent to the insertion, removal of Force F, causes balls 22a to be fixed in the shaded portion of hole 22b to enable climbing hold 8 to be locked into plate 7. The insertion of loading pins 24p into holes 24s prevent the rotation climbing hold 8 and balls 22a enables climbing hold 8 to be attached into plate 7. The insertion of loading pins 24p into holes 24s enables most of the weight of a climber to be borne by loading pins 24p instead of ball-lock pin 22. Applying force F to the head end of ball-lock pin 22 so that the reduced diameter D1 of the lock end is parallel to ball 22a also enables the un-attaching of climbing hold 8 from plate 7 by pulling out of climbing hold 8 with robotic arm/end-effector 3 under control of controller 1.

Figure 6:
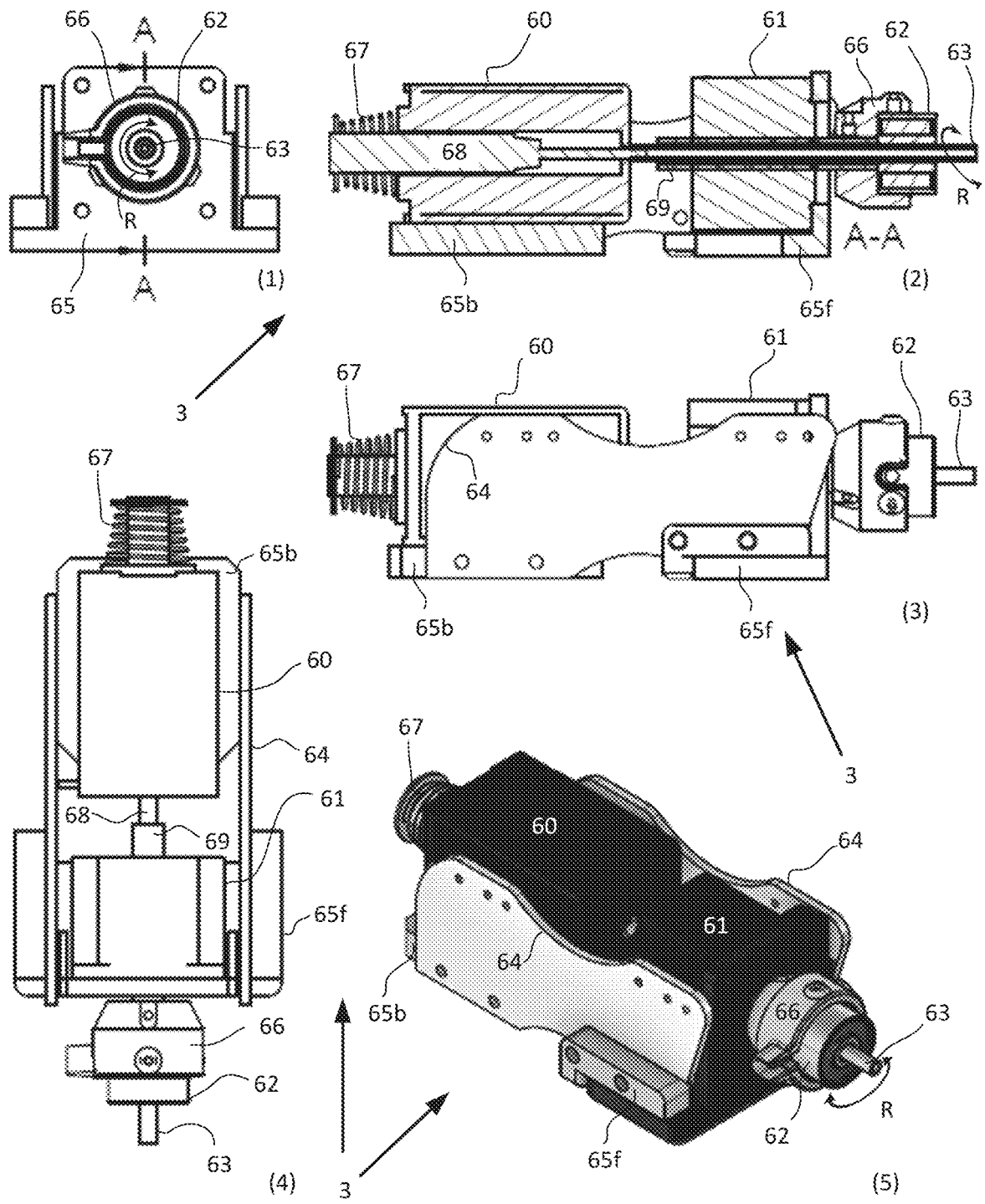
FIG. 6 shows further details of an end-effector, in accordance with some embodiments.

Reference is now made to FIG. 6, which shows further details of end-effector 3, in accordance with some embodiments. End effector 3 In end view (1) line of section AA goes through a collar 66 that surrounds an electromagnet 62 and an actuator rod 63. Actuator rod 63 goes through an end plate included in front base plate 65f. Section AA is shown in side cross sectional view (2) that shows solenoid 60 attached to back base plate 65b. Solenoid 60 is shown in its un-energized state by utilization of spring 67 that attaches to piston 68. Stepper motor 61 attached to front base plate 65f. The narrower portion of piston 68 attaches to actuator rod 63 that is longitudinally moveable left to right through shaft 69 that is included in stepper motor 61, further through the endplate of front base plate 65f, collar 66 and electromagnet 62. Collar 66 and electromagnet 62 are centrally rotatable clockwise and anticlockwise with rotation R by stepper motor 61 as shown in end view (1).

In side view (3), top plan view (4) and perspective view (5) two side plates 64 attach perpendicular to front base plate 65f and to back base plate 65b. The two side plates 64 further attach to the sides of solenoid 60 and stepper motor 61. Collar 66 and electromagnet 62 are centrally rotatable clockwise and anticlockwise with rotation R by stepper motor 61 as shown in perspective view (5).

Preferably, but not limited in the descriptions so far and in descriptions that follow, stepper motor 61 does not rotate actuator rod 63. Control of end-effector 3 and robotic arm 4 is included a control algorithm of controller 1. Specifically, the control algorithm enables activation of electromagnet 62 to connect to back plate 26 of climbing hold 8. The detachable connection to back plate 26 may also be pneumatically activated or via a hook latching system for example. Once electromagnet 62 is attached to back plate 26, the control algorithm further enables activation of solenoid 60 to provide force F to the head end of ball-lock pin 22 of climbing hold 8. The force F by virtue of by actuator rod 63 moving from left to right through shaft 69, the endplate of front base plate 65f, collar 66 and electromagnet 62, enables robotic arm 4 and control of end-effector 3 to insert climbing hold 8 in plate 7 at the correct angular position. Subsequent release of force F by deactivating solenoid 60 locks climbing hold 8 into plate 7. Similarly, when electromagnet 62 is connected to back plate 26 and force F is applied to the head end of ball-lock pin 22; climbing hold 8 is enabled to be unlocked and removed from plate 7 by robotic arm 4 pulling climbing hold 8 away from plate 7.

Figure 7:
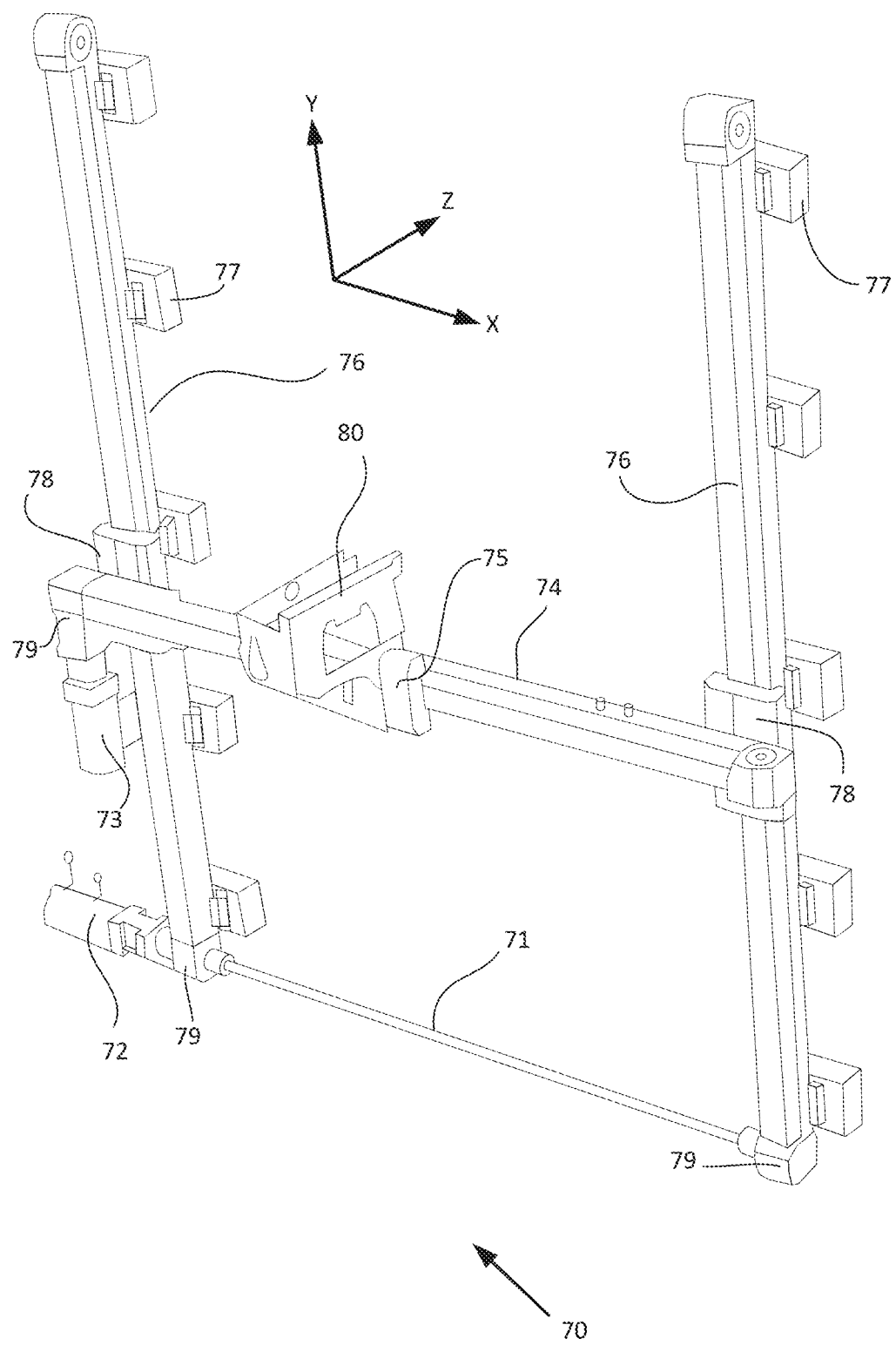
FIG. 7 shows a two-dimensional (2D) motion system, in accordance with some embodiments.

Reference is now made to FIG. 7, which shows a two dimensional (2D) motion system 70, in accordance with some embodiments. M robotic arm 4, end-effector 3 is attached to the end of robotic arm 4. The base end of arm is attached to shelf 91. Shelf 91 is attached perpendicular to slider 75 that moveably attached to cross rail 74. Slider 75 moveably connected to electric linear actuator 79, moves slider 75/robotic arm 4 left and right along cross rail 74 in the direction of the X-axis. Since cross rail 74 is attached at both ends of left and right sliders 78, robotic arm 4 moves up and down in the direction of the Y-axis. Therefore, both robotic arm 4 and manipulator 80 may be moveable in two dimensions (2D) in the XY plane. Robotic arm 4 which is controllable by controller 1 to extend or retract end effector 3 towards and back from in the other side of climbing wall 13*a* in the direction of the Z-axis.

The extension or retraction of end-effector 3 enables attachment or reattachment of a climbing hold 8 from a plate 7 or 42 in the other side of climbing wall 13*a* and/or a store area 2. Machine vision (MV) included in end-effector 3 may allow for an assessment as to the present orientation of climbing 8 in store area 2 or the other side of climbing wall 13*a*. The assessment may further enable the orientation of end-effector 3 and its movement towards store area 2 or the other side of climbing wall 13*a* to grab a selected climbing hold 8. Robotic arm 4 and end-effector 3 may then be moved towards climbing wall 13*a* to mechanically attach the selected climbing hold 8 to a specific plate 7/carrying medium 9. The mechanical attachment being at a desired location and at an orientation of the selected climbing hold 8 relative to an orientation of carrying medium 9. includes a cross rail 74 with two ends attached to two sliders 78 that are moveably attached to vertical rails 76.

Slider 75 is movably attached to cross rail 74 and mounted perpendicular to slider 75 is manipulator 80 in the direction of the Z-axis. Stepper motor 73 attaches to one end of cross rail 74 and provides rotational motion that is converted into a linear motion via an electric linear actuator 79 which moves slider 75 left and right along cross rail 74 in the direction of the X-axis. Stepper motor 72 attaches to the bottom end of the left hand vertical rail 76 and provides rotational motion that is converted into a linear motion via another electric linear actuator 79 that moves left slider 78 up and down left hand vertical rail 76 in the direction of the Y-axis. The rotational motion of stepper motor 72 is transferred via rotor bar 71 to yet another electric linear actuator 79 that is attached to right hand vertical rail 76. Linear actuator 79 attached to right hand vertical rail 76 moves right slider 78 up and down right hand vertical rail 76 in the direction of the Y-axis. Since cross rail 74 is attached at both ends to left and right sliders 78 manipulator 80 moves up and down in the direction of the Y-axis. Therefore, manipulator 80 is moveable in two dimensions (2D) in the XY plane. Control of motion system 70 may be included in a control algorithm executed by controller 1.

Figure 8A:
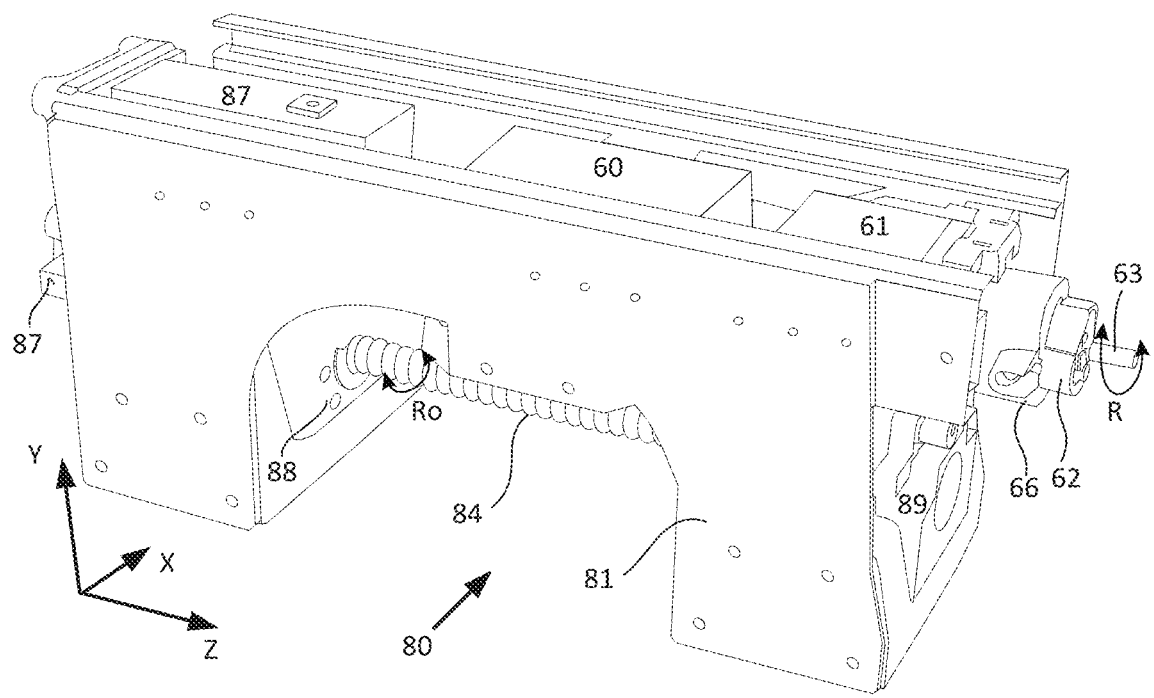
FIG. 8A and FIG. 8B show perspective views of a manipulator in shortened and extended mode respectively, in accordance with some embodiments.
Figure 8B:
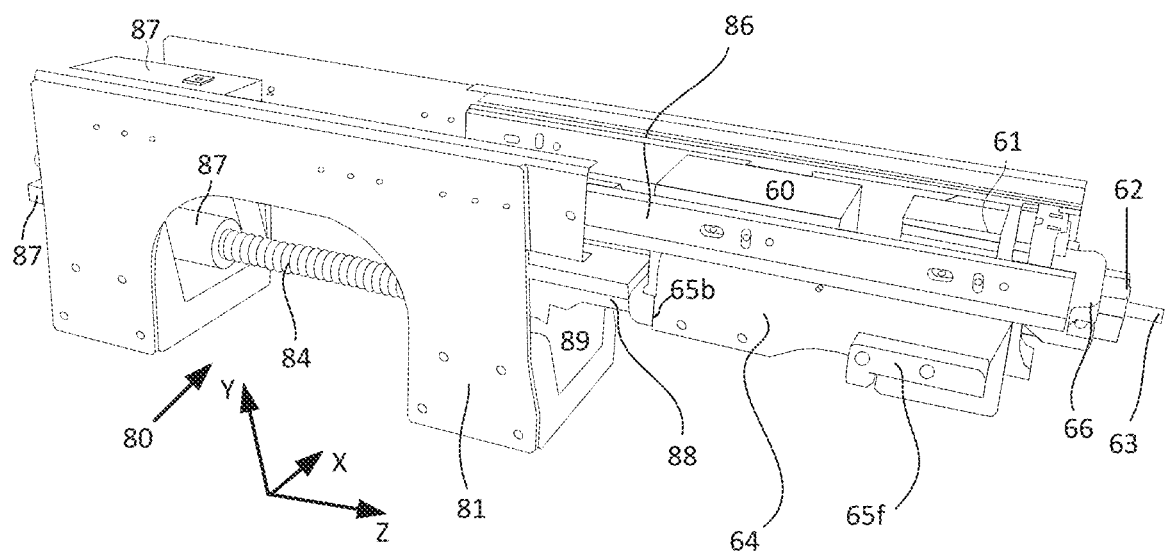

Reference is now made to FIGS. 8A and 8B, which show perspective views of manipulator 80 shortened and extended respectively along the Z-axis, in accordance with some embodiments. Side plates 81 at the left end, houses the motor frame of motor 87 which has a rotational output Ro conveyed to a bearing housing 89 housed at the right end of side plates 81 by a lead screw 84. End effector 3 is shown mounted to rails 86 by two side plates 64 that further attach to the sides of solenoid 60 and stepper motor 61. Collar 66 and electromagnet 62 are centrally rotatable clockwise and anticlockwise with rotation R perpendicular to the Z-axis in the XY plane by stepper motor 61. Platform 88 connects to lead screw 84 and to back base plate 65*b*. Activation of motor 87 moves platform 88 and end effector 3 left and right in direction of the Z-axis utilizing rails 86.

Figure 9:
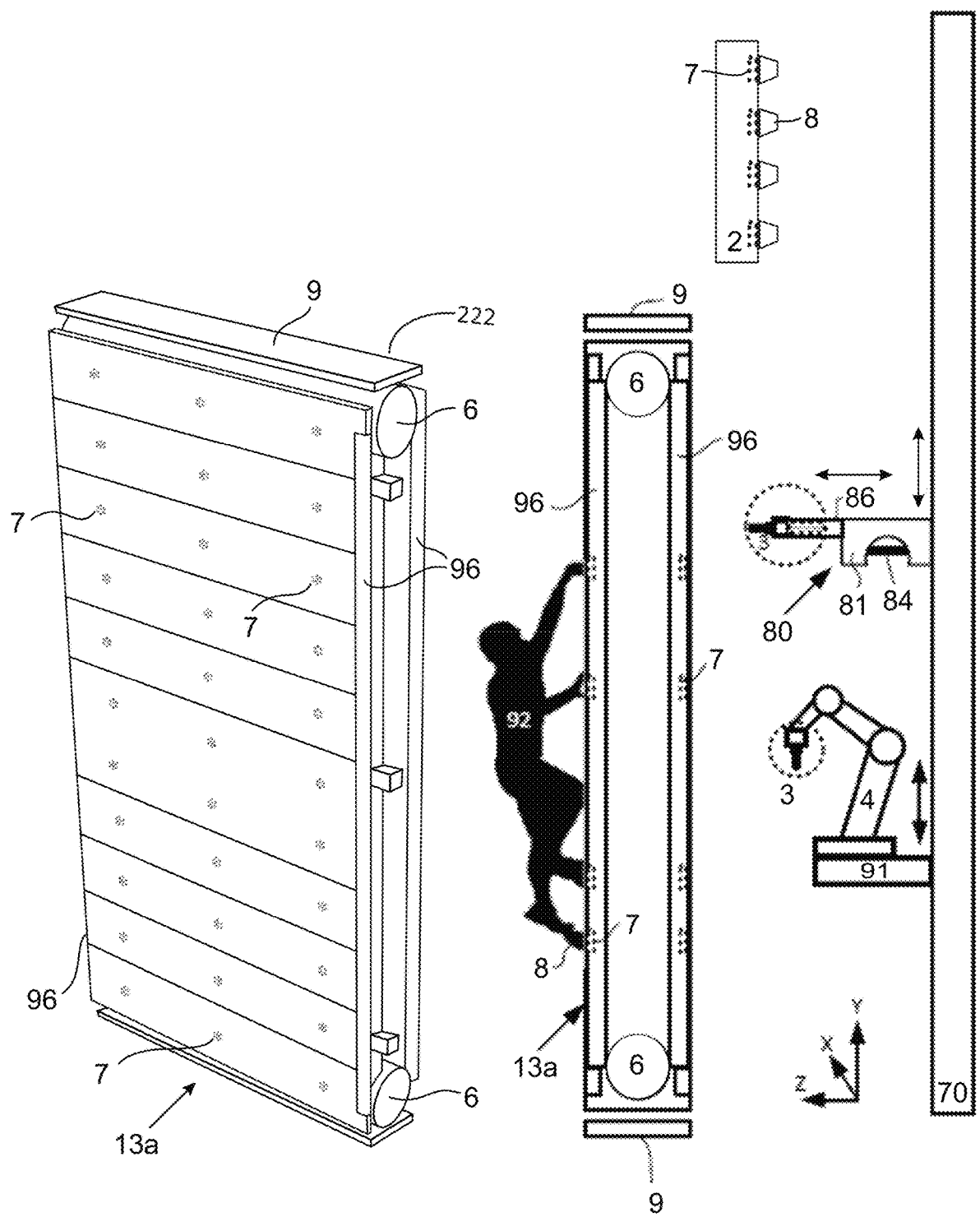
FIG. 9 shows a perspective view and a side view of a climbing wall, in accordance with some embodiments.

Reference is now made to FIG. 9, which shows a perspective view and a side view of a climbing wall 13*a*, in accordance with some embodiments. In the perspective view climbing wall 13*a* similar to climbing wall 13, includes multiple carrying mediums 9. Each carrying medium 9 includes multiple plates 7 attached to each carrying medium. Each carrying medium 9 may be uniquely addressable and each of plates 7 or 42 may also be uniquely addressable at a particular location in a carrying medium 9. Climbing wall 13 is an example of a static climbing wall, whereas climbing wall 13*a* is an example of a moving or dynamic climbing wall. Climbing wall 13*a* further includes a-conveyer (222) that includes a belt (not shown) rotatable by a motor (not shown). The belt attaches to carrying mediums 9 and is moveably attached to one of gears 6 that are rotated by the motor. The belt, therefore, provides a moveable up and down loop of carrying mediums 9 at the front and back of climbing wall 13*a* which is bound by frame 97 to stop lateral movement of carrying mediums 9 when the moveable loop is moved or when the climbing wall 13*a* is static and is being climbed by a climber 92.

In the side view, climber 92 can be seen using climbing holds 8 attached to plates 7 to climb up on one side of climbing wall 13*a*. Opposite the other side climbing wall 13*a* are two options that may be utilized to attach or reattach a climbing hold 8 from a plate 7 or 42 in the other side of climbing wall 13*a* and/or a store area 2 that includes multiple plates 7/42 and climbing holds 8. The two options that may be utilized to attach or reattach a climbing hold 8 from a plate 7 or 42 in the other side of climbing wall 13*a* and/or a store area 2 are robotic arm 4 or manipulator 80.

With respect to manipulator 80, manipulator 3 is attached to motion system 70, specifically to slider 75. Slider 75 is movably attached to cross rail 74 and mounted perpendicular to slider 75 is manipulator 80 which is controllable by controller 1 to extend or retract end effector 3 out and in respectfully in the direction of the Z-axis. Slider 75 moveably connected to electric linear actuator 79, moves slider 75/manipulator 80 left and right along cross rail 74 in the direction of the X-axis. Since cross rail 74 is attached at both ends of left and right sliders 78, manipulator 80 also moves up and down in the direction of the Y-axis. Therefore, manipulator 80 is moveable in two dimensions (2D) in the XY plane. A positioning of manipulator in the XY plane to locate end effector 3 opposite the correct plates 7 or 42 then allows the extension or retraction of end-effector 3 in the direction of the Z-axis. The extension or retraction of end-effector 3 enables attachment or reattachment of a climbing hold 8 from a plate 7 or 42 in the other side of climbing wall 13*a* and/or a store area 2. Alternatively to moving manipulator 80 or robotic arm 4 up and down With respect to robotic arm 4, end-effector 3 is attached to the end of robotic arm 4. The base end of arm is attached to shelf 91. Shelf 91 is attached perpendicular to slider 75 which moveably attached to cross rail 74. Slider 75 moveably connected to electric linear actuator 79, moves slider 75/robotic arm 4 left and right along cross rail 74 in the direction of the X-axis. Since cross rail 74 is attached at both ends of left and right sliders 78, robotic arm 4 moves up and down in the direction of the Y-axis. Therefore, both robotic arm 4 and manipulator 80 may be moveable in two dimensions (2D) in the XY plane. Robotic arm 4 which is controllable by controller 1 to extend or retract end effector 3 towards and back from in the other side of climbing wall 13*a* in the direction of the Z-axis. The extension or retraction of end-effector 3 enables attachment or reattachment of a climbing hold 8 from a plate 7 or 42 in the other side of climbing wall 13*a* and/or a store area 2. Machine vision (MV) included in end-effector 3 may allow for an assessment as to the present orientation of climbing 8 in store area 2 or the other side of climbing wall 13a. The assessment may further enable the orientation of end-effector 3 and its movement towards store area 2 or the other side of climbing wall 13a to grab a selected climbing hold 8. Robotic arm 4 and end-effector 3 may then be moved towards climbing wall 13a to mechanically attach the selected climbing hold 8 to a specific plate 7/carrying medium 9. The mechanical attachment being at a desired location and at an orientation of the selected climbing hold 8 relative to an orientation of carrying medium 9.

Figure 10:
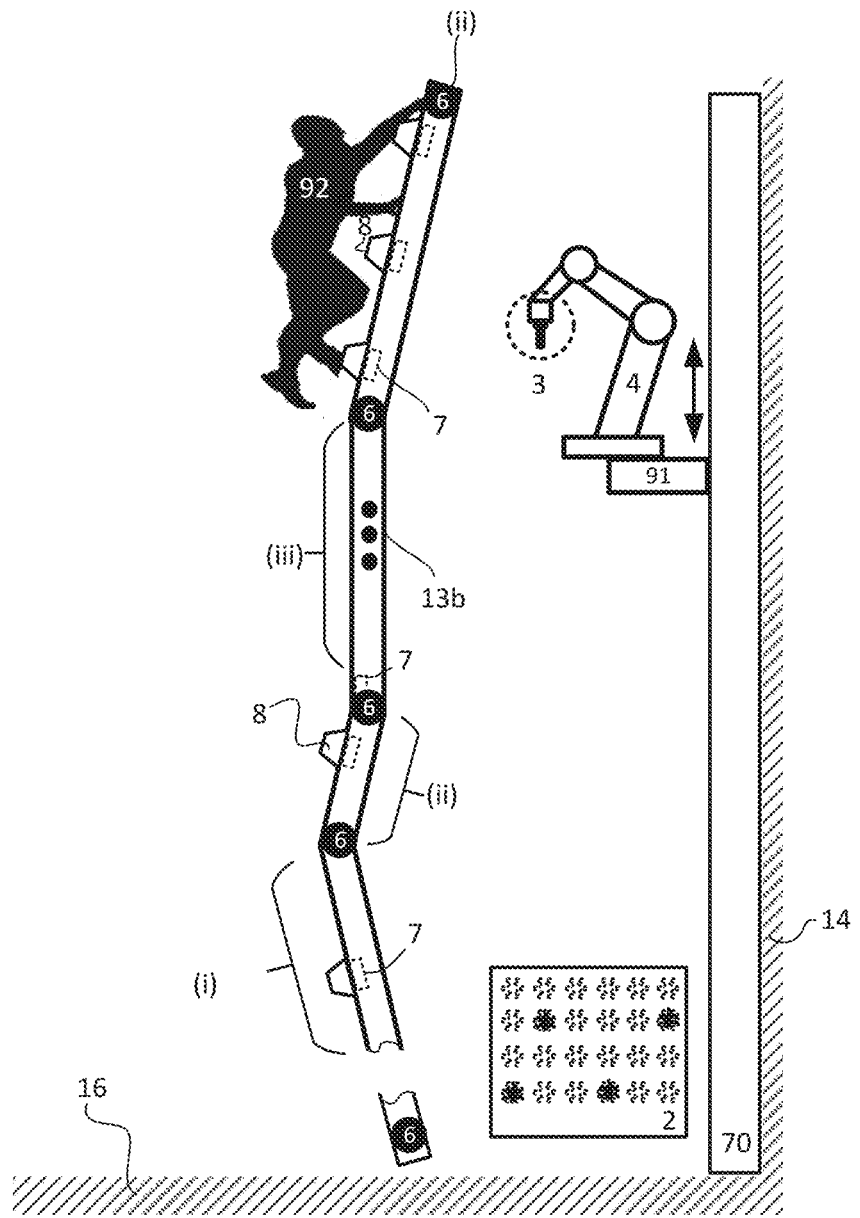
FIG. 10 shows a side view of a climbing wall, in accordance with some embodiments.

Reference is now made to FIG. 10, which shows a side view of a climbing wall 13b, in accordance with some embodiments. The side view shows that in addition to a vertical section formed by multiple sections of carrying mediums 9 to represent a vertical face (iii) one may find in a rock-climbing situation. Other sections shown in the side view include overhanging faces (ii) that are overhung or angled more than 90 degrees and slabs (i) that are angled at less than 90 degrees or less than vertical. The side view shows climbing holds 8 that are attached to plates 7. Further included in climbing wall 13b are multiple conveyers that includes multiple belts (not shown) rotatable by multiple motors (not shown). The belts attach to carrying mediums 9 and is moveably attached to one of gears 6 that are rotated by the motor. The belts, therefore, provide a moveable up and down loops of carrying mediums 9 for each of the face sections (i), (ii) and (iii). Multiple frames 97 to stop lateral movement of carrying mediums 9 when the moveable loops are moved or when the climbing wall 13b is static and is being climbed by a climber 92.

Robotic arm 4, end-effector 3 is attached to the end of robotic arm 4. The base end of arm is attached to shelf 91. Shelf 91 is attached perpendicular to slider 75 of motion system 70 that moveably attached to cross rail 74. Both motion system 70 and climbing wall 13b attached to a wall 14 and ground 16 in proximity to a robotic arm 4 and a store area 2. Slider 75 moveably connected to electric linear actuator 79, moves slider 75/robotic arm 4 left and right along cross rail 74 in the direction of the X-axis. Since cross rail 74 is attached at both ends of left and right sliders 78, robotic arm 4 moves up and down in the direction of the Y-axis. Robotic arm 4 may be moveable in two dimensions (2D) in the XY plane. Robotic arm 4 which is controllable by controller 1 to extend or retract end effector 3 towards and back from in the other side of climbing wall 13b in the direction of the Z-axis. The extension or retraction of end-effector 3 enables attachment or reattachment of a climbing hold 8 from a plate 7 or 42 in the other side of climbing wall 13b and/or a store area 2. Machine vision (MV) included in end-effector 3 may allow for an assessment as to the present orientation of climbing 8 in store area 2 or the other side of climbing wall 13b. The assessment may further enable the orientation of end-effector 3 and its movement towards store area 2 or the other side of climbing wall 13b to grab a selected climbing hold 8 using robotic arm 4 and end-effector 3 by virtue of the six degrees of freedom robotic arm 4/end-effector 3 provides. the six degrees of freedom robotic arm 4/end-effector 3 provides may be utilized to move climbing hold 8 towards climbing wall 13b to mechanically attach the selected climbing hold 8 to a specific plate 7/carrying medium 9. The mechanical attachment being at a desired location and at an orientation of the selected climbing hold 8 relative to an orientation of carrying medium 9.

Figure 11:
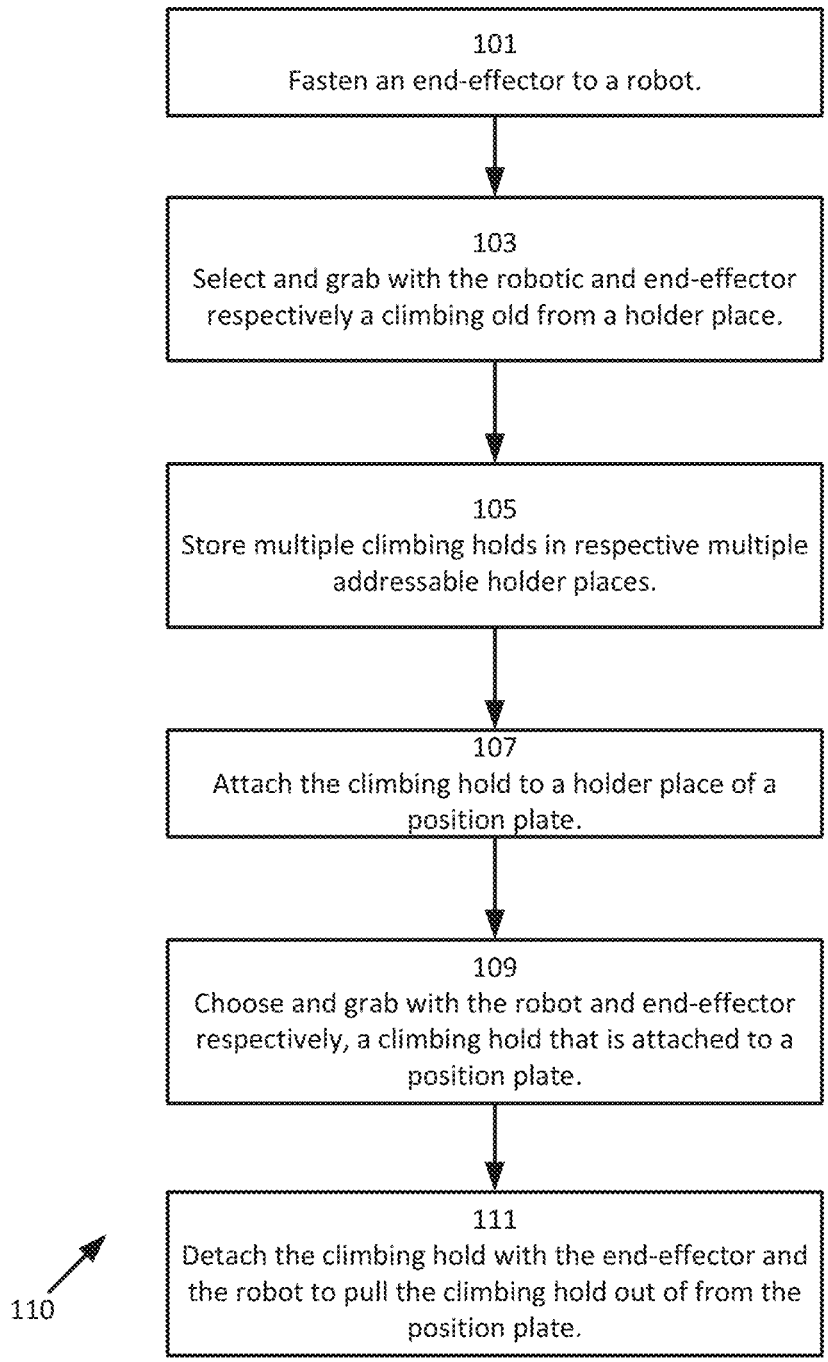
FIG. 11 shows a flow chart of a method, in accordance with some embodiments.

Reference is now made to FIG. 11, which shows a flow chart of a method 110, in accordance with some embodiments. By way of non-limiting example, the description that follows refers to the control of controller 1 and a control algorithm. Control by the control algorithm includes operation of motion system 70 to move either robotic arm 4 or manipulator 80, up and down, left or right at the front or back of climbing wall 13b and robotic arm 4/end-effector 3 and to re-attach climbing holds 8 into plate 7 or 42. The re-attaching of climbing holds 8 into plate 7 or 42 may be according to a climbing route appropriate selected for a climber 92 of climbing wall 13b. The moveable up and down of carrying mediums 9 at the front and back of climbing wall 13b to enable a certain carrying medium 9 to be in the vicinity of end-effector 3 may be by use of the belt(s) attached to each carrying medium 9 rotationally attached to gears 6.

At step 101, end-effector 3 is fastened to robotic arm 4, both end-effector 3 and robotic arm 4 are under control of controller 1 which runs a control algorithm which in general is reconfigurable to each of the climbing wall types described above. End-effector 3 may be fastened to robotic arm electro-mechanically, electro-magnetically, pneumatically or by a hook latching fastening arrangement. Specifically, with respect to climbing wall 13b, at step 103, both end-effector 3 and robotic arm 4 are used to select and grab a climbing hold 8 from a holder place. The holder place may be a storage place 2 or a carrying medium 9 of climbing wall 13b where both the storage place 2 and the carrying medium 9 include addressable plates 7 or 42. The addressable holder place is typically associated with a particular climbing hold 8 shape. The particular climbing hold 8 shape may further include an RF identity (ID) tag to enable for example, a correct identification and selection of a climbing hold 8 from store area 2 or a climbing hold 8 from carrying medium 9 included in climbing wall 13b.

Machine vision (MV) included in end effector 3 or robotic arm 4 may include technology and methods used to extract information from an image captured of climbing hold 8. The information extracted can be a simple good-part/bad-part signal, or more a complex set of data such as the identity, position and orientation of each climbing hold 8 in an image for example. In general, robotic arm 4 may provide position and orientation of end effector 3, under control of the control algorithm to grab and maneuver each climbing hold 8 in six degrees of freedom. Six degrees of freedom (6DOF) refers to the freedom of movement of end effector 3 and/or climbing hold 8 in three-dimensional (3D) space. Specifically, selected and grabbed climbing hold 8 is free to change position as forward/backward (surge), up/down (heave), left/right (sway) translation in three perpendicular axes, combined with changes in orientation through rotation about three perpendicular axes, often termed yaw (normal axis), pitch (transverse axis), and roll (longitudinal axis).

Upon correct identification of a required climbing hold 8, with the use of robotic arm 4 and/or movement system 70 robotic arm 4 and end-effector 3 is moved towards climbing wall 13b or to storage area 2. Robotic arm 4 and end effector 3 is moved towards an addressable plate 7 or 42 at a desired location of the selected climbing hold 8 relative to an orientation of carrying medium 9 or to storage area 2 holding the addressable plate 7 or 42. The control algorithm may further enables activation of stepper motor 61 to enable correct rotational orientation of climbing hold 8 relative to the planar surface of plates 7 or 42. To enable thereby, the storing of climbing hold 8 by attaching climbing 8 to plates 7 or 42 in storage area 2 at the correct angular position at step 105, or to enable thereby, the storing of climbing hold 8 to plates 7 or 42 in carrying medium 9 at the correct angular position at step 107.

The attaching of climbing hold 8 to plates 7 or 42 at steps 105/107 is by the control algorithm enables activation of electromagnet 62 to connect to back plate 26 of climbing hold 8. The detachable connection to back plate 26 of climbing hold 8 may also be pneumatically activated or via a hook latching system for example. Once electromagnet 62 is attached to back plate 26, the control algorithm further enables activation of solenoid 60 to provide force F to the head end of ball-lock pin 22 of climbing hold 8. The force F by virtue of by actuator rod 63 moving from left to right through shaft 69, the endplate of front base plate 65f, collar 66 and electromagnet 62, enables robotic arm 4 and control of end-effector 3 to insert climbing hold 8 in plate 7 at the correct angular position. Insertion of climbing hold 8 in plate 7 at the correct angular position may be if carrying medium 9 is not moving or when carrying medium 9 is moving by rotational motion of gears 6. Subsequent release of force F by deactivating solenoid 60 locks climbing hold 8 into plate 7. The removal of force F from ball-lock pin 22 through aperture A2, locks balls 22a in the shaded portion of hole 22b with respect to plate 7, thereby attaching climbing hold 8 to plate 7. Similarly, when force F is removed from ball-lock pin 22, one or more balls 22a are locked behind the back of plate 42 through hole 41, thereby attaching climbing hold 8 to plate 42. The insertion of pin shaft 28 and loading pins 24p of climbing hold 8 into respective holes 22b/41 and holes 24s prevent the rotation climbing hold 8 and balls 22a enables climbing hold 8 to be locked into plates 7 or 42.

At step 109, a climbing hold 8 to be detached from plates 7 or 42 may be chosen and grabbed by end-effector 3 and robotic arm 4. Upon correct identification of a required climbing hold 8 (step 101), with the use of robotic arm 4 and/or movement system 70, robotic arm 4 and end-effector 3 are moved towards climbing wall 13b or to storage area 2. Robotic arm 4 and end-effector 3 is moved towards an addressable plate 7 or 42 at a desired location of the selected climbing hold 8 relative to an orientation of carrying medium 9 or to an orientation of storage area 2 that holds the addressable plate 7 or 42. The control algorithm may further enable activation of stepper motor 61 to enable correct rotational orientation of climbing hold 8 relative to the planar surface of plates 7 or 42.

The detaching of climbing hold 8 to plates 7 or 42 at step 111 is by the control algorithm enabling activation of electromagnet 62 to connect to back plate 26 of the climbing hold 8 to be detached. The detachable connection to back plate 26 of climbing hold 8 may also be pneumatically activated or via a hook latching system for example. Once electromagnet 62 is attached to back plate 26, the control algorithm further enables activation of solenoid 60 to provide force F to the head end of ball-lock pin 22 of climbing hold 8. The force F by virtue of by actuator rod 63 moving from left to right through shaft 69, the endplate of front base plate 65f, collar 66 and electromagnet 62, enables robotic arm 4 and control of end-effector 3 to pull out climbing hold 8 from plates 7 or 42 at the correct angular position. Applying force F to the head end of ball-lock pin 22 so that the reduced diameter D1 of the lock end is parallel to ball 22a also enables the un-attaching of climbing hold 8 from plate 42 because one or more balls 22a are no longer locked behind the back of plate 42 through hole 41. Similarly, one or more balls 22a are no longer locked in hole 22b with respect to plate 7. Therefore, climbing hold 8 is enabled to be unlocked and removed from plate 7 by robotic arm 4 pulling climbing hold 8 away from plates 7 or 4 with force F applied to the head end of ball-lock pin 22. Pulling climbing hold 8 away from plates 7 or 4 at the correct angular position may be if carrying medium 9 is not moving or when carrying medium 9 is moving by rotational motion of gears 6.

In sum with respect to the descriptions above, either robotic arm 4 or manipulator 80 may be controlled by a control algorithm of controller 1 to attach or reattach a climbing hold 8 from one addressable place in a carrying medium 9 to another place in the carrying medium 9 or to another addressable place in another carrying medium 9. Store area 2 includes multiple plates 7 that are utilized to hold and store multiple climbing holds 8. plates 7 may be uniquely addressable for a particular type of climbing hold 8 that has a particular shape profile. Climbing hold 8 may include an RF identity (ID) tag to enable for example, a correct selection of a climbing hold 8 from store area 2 or a climbing hold 8 from carrying medium 9 included in climbing walls 13, 13a and 13b. By way of non-limiting example, in the case of six holes 24s of plates 7 or 42 and three loading pins 24p of climbing hold 8, 60° degree increments of rotational orientation relative to the planar surface of plates 7 or 42 are provided to attach climbing hold 8 to plates 7 or 42. Rotation of climbing hold 8 to the correct rotational orientation relative to the planar surface of plates 7 or 42 may be by use of stepper motor 61. Specifically, the control algorithm further enables activation and deactivation of electromagnet 62 to connect to back plate 26 and disconnect from back plate 26 of climbing hold 8 respectively. Alternatively to moving manipulator 80 or robotic arm 4 up and down, the belt(s) attached to each carrying medium 9 and rotationally to gears 6, may provide a moveable up and down of carrying mediums 9 at the front and back of climbing walls 13a and 13b. The moveable up and down of carrying mediums 9 at the front and back of climbing walls 13a and 13b to enable a certain carrying medium 9 to be in the vicinity of end-effector 3.

The descriptions above explain how robotic arm 4/end-effector connects a climbing hold 8 hold, and then removes another climbing hold 8. The control algorithm may also include the process of first removing a climbing hold 8 and then connects a new climbing hold 8 or a procedure that removes all climbing holds 8 from carrying medium 8 before placing new climbing holds 8 into the carrying medium. The control algorithm may further include consideration of the classical travelling sales-man problem in the context of a climbing wall. Given a list of climbing holds and their location, and the distances between climbing holds. The control algorithm is capable of determining the shortest possible route that enables the most time efficient way of configuring a climbing wall according to a desired climb route for a climber.

A number of benefits of the electro-mechanical system described above includes; (i) the electro-mechanical system is capable of picking and placing climbing holds on a climbing wall (which could be moving), as well as a specialized locking mechanism for the climbing holds to enable them to be quickly attached and detached. (ii) The electro-mechanical system is capable of picking and placing climbing holds on a climbing wall in a way that does not require the same environmental or safety conditions that humans require (additional staging/scaffolding for example) and may include sensors and/or actuators that may be more capable than humans are. (iii) The electro-mechanical system is capable of picking and placing climbing holds on one side of a climbing wall according to the requirements of a next climber of the climbing wall, while a climber is using the other side of the climbing wall. (iv) The electro-mechanical system that may include a conveyer, is capable of providing none repeating, long routes in low ceiling rooms. (v) The electro-mechanical system shows two types of climbing wall, static and dynamic. Both of the static and dynamic, to change the climbing route, according to the aspects described above, saves the need for shutdown and manual labor to be applied to the climbing wall, while enabling a faster change to the climbing route.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed:

1. An apparatus comprising:
   a carrying medium comprising a conveyor having a plurality of interconnected climbing surfaces included in a climbing wall;
   a plurality of climbing holds connected to one or more of the plurality of interconnected climbing surfaces;
   a robot having an end-effector adapted to be detachably connected to each of the plurality of climbing holds; and
   a controller adapted to instruct at least one of the robot and the end-effector to:
   select one of the plurality of climbing holds,
   grab a selected climbing hold of the plurality of climbing holds,
   mechanically attach the selected climbing hold to the carrying medium at a desired location and at an orientation of the selected climbing hold relative to an orientation of the carrying medium,
   grab the selected climbing hold to mechanically detach the selected climbing hold from the carrying medium, and
   pull the selected climbing hold out of the carrying medium.

2. The apparatus of claim 1, wherein the plurality of climbing holds are stored in a store area in a plurality of addressable holder places for selection by the robot.

3. The apparatus of claim 2, wherein the robot is configurable to remove the climbing hold from the carrying medium and to place the climbing hold at a designated address of a holder place of the plurality of addressable holder places at a desired rotational angular position.

4. The apparatus of claim 1, wherein the robot is at least one of a robotic arm and a two dimensional movement system.

5. The apparatus of claim 1, wherein the carrying medium includes at least one plate to enable the mechanical reattaching of the selected climbing hold to and from the carrying medium, wherein the plate is incorporated in each carrying medium to make each carrying medium a monolithic structure.

6. The apparatus of claim 1, further comprising an actuator adapted to rotate the carrying medium in a control loop.

7. The apparatus of claim 1, wherein inserting the climbing hold into the carrying medium or pulling the climbing hold out of the carrying medium is according to a climb route selected for a climber of the climbing wall.

8. The apparatus of claim 1, wherein the plurality of climbing holds are a plurality of different sizes and shapes.

9. The apparatus of claim 1, wherein the robot is configurable to insert the climbing hold into the carrying medium at a desired rotational angular position according to a climb route selected for a climber of the climbing wall.

10. A method comprising:
selecting and grabbing, utilizing a robot having an end-effector, a climbing hold of a plurality of climbing holds from a plurality of addressable holder places;
storing using the robot, the plurality of climbing holds in the plurality of addressable holder places;
attaching the climbing hold one or more plates of
a plurality of plates from a plurality of interconnected climbing surfaces rotated by a conveyer included in a climbing wall, wherein the attaching is performed by the robot utilizing the end-effector for inserting the climbing hold into the plate;
choosing and grabbing utilizing the robot and end-effector respectively, a climbing hold of the plurality of climbing holds attached to a plate of the plurality of plates;
detaching the climbing hold utilizing the end-effector and the robot pulling the climbing hold out of the plate.

11. The method of claim 10, wherein the fastening is at least one of electro-mechanically fastening, electro-magnetically fastening, pneumatically fastening and hook latching fastening.

12. The method claim 10, wherein the inserting of the climbing hold into the plate or the pulling of the climbing hold out of the plate is according to a climb route selected for a climber of the climbing wall.

13. The method of claim 10, wherein the robot is at least one of a robotic arm and a two dimensional movement system.

14. The method of claim 10, wherein the plurality of climbing holds are a plurality of different sizes and shapes.

15. The method of claim 10, wherein the inserting of the climbing hold into the plate at a desired rotational angular position is according to a climb route selected for a climber of the climbing wall.

16. The method of claim 10, wherein the detaching of the climbing hold from the plate and placing of the climbing hold at a designated address of a holder place of the plurality of addressable holder places is at a desired rotational angular position.

17. A climbing hold mechanism comprising:
a body disposed and mechanically attached between a front plate and a back plate including a front hole and a back hole respectively;
a pin shaft including a section of the pin shaft protruding out from and perpendicular to the front plate, and the pin shaft mechanically attached to the front hole and further attached to an interior wall of the body;
a ball-lock pin including:
a head end with a diameter wider than the diameter of the ball-lock pin;
a lock end opposite the head end that includes a reduced diameter section of the ball-lock pin;
a spring disposed in the pin shaft around the diameter of the ball-lock pin and located between the front plate and the head end;
at least one ball seat-able in an aperture in the section of the pin shaft protruding out from and perpendicular to the pin shaft.

18. The climbing hold mechanism of claim 17, further comprising a loading pin attached to the front plate and protruding out from and perpendicular to the front plate, wherein the loading pin is located concentrically lateral to the ball-lock pin.

19. The climbing hold mechanism of claim 18, wherein the loading pin and the pin shaft are re-insertable into respective holes of a plate.

20. The climbing hold mechanism of claim 17, wherein the front plate is magnetic.

21. The climbing hold mechanism of claim 19, wherein the ball-lock pin is configured to:
receive a force to the spring and to the head end through the back hole of the back plate to simultaneously unlock the ball-lock pin and pull the ball-lock pin out of the plate, wherein the force unseats the at least one ball from the aperture into the reduced diameter section of the ball-lock pin, and
release the force to simultaneously lock the ball-lock pin and insert the ball-lock pin into the plate, wherein the release reseats the at least one ball in the aperture adjacent to the reduced diameter section of the ball-lock pin.

* * * * *